April 23, 1940.  E. A. ODIN  2,197,875
CLAMPING MECHANISM
Original Filed May 3, 1937  2 Sheets-Sheet 1
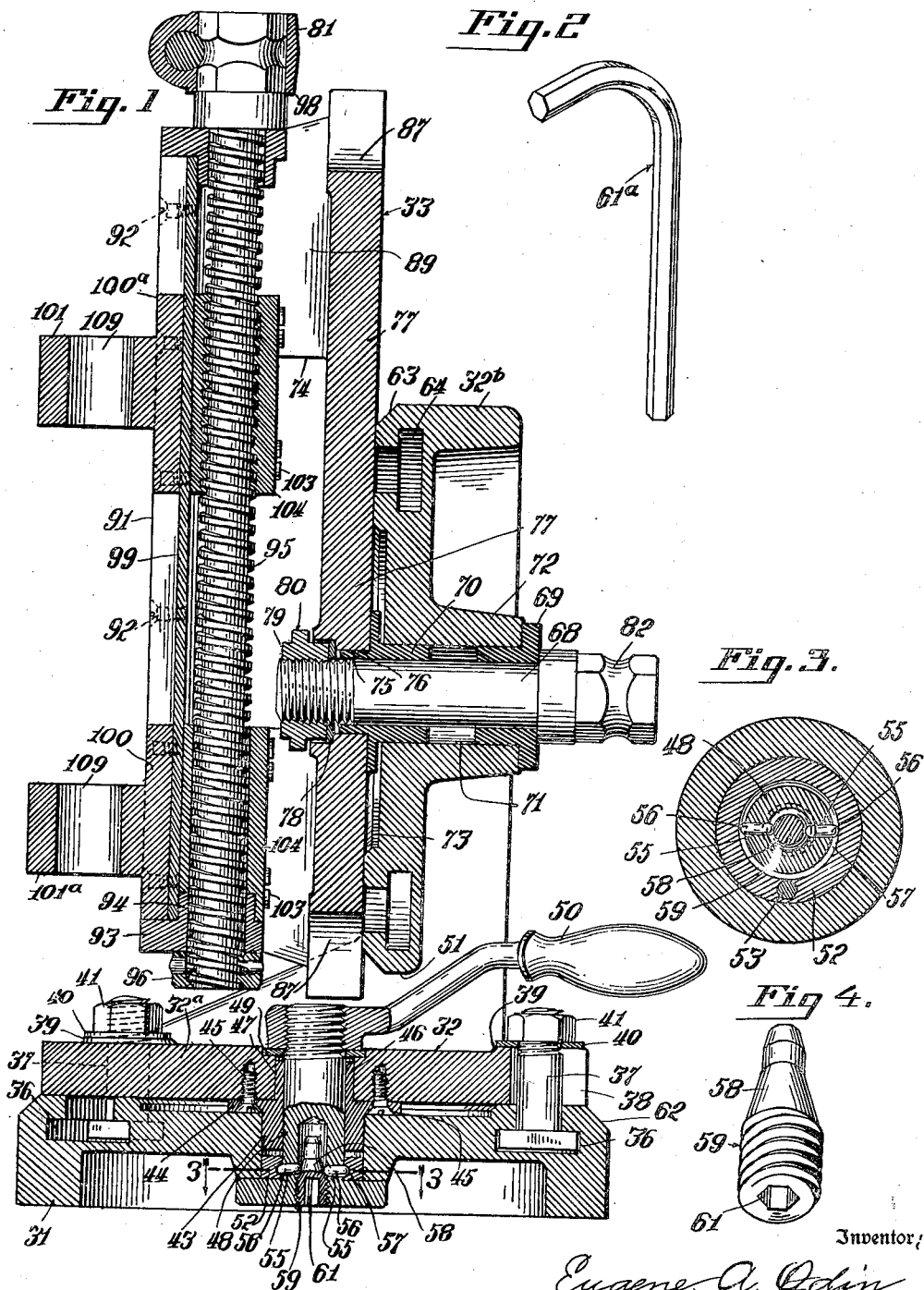
Inventor:
Eugene A. Odin
by John Howard McElroy
his Attorney April 23, 1940.    E. A. ODIN    2,197,875
CLAMPING MECHANISM
Original Filed May 3, 1937    2 Sheets-Sheet 2
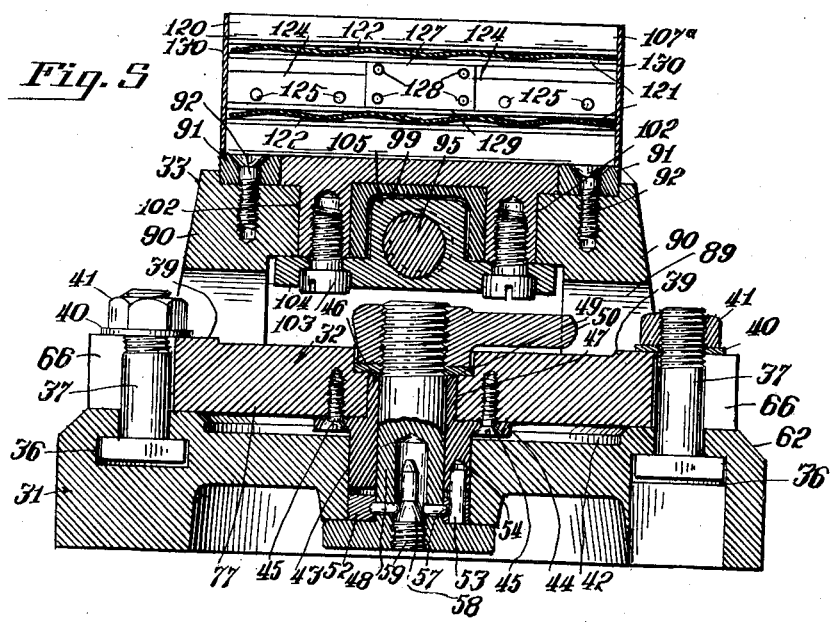
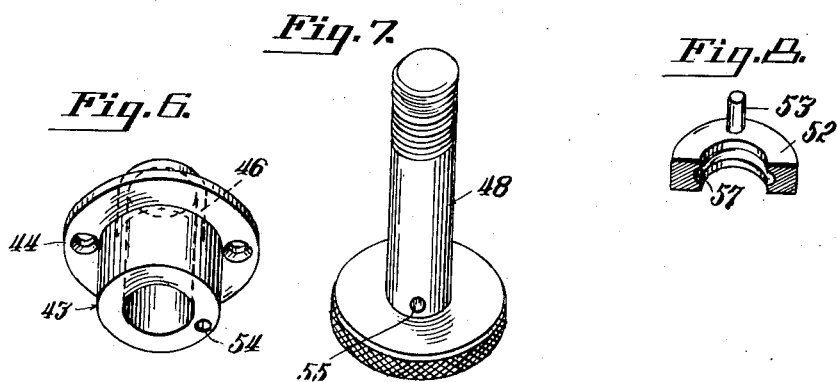
Inventor:
Eugene A. Odin
by John Howard McElroy
his Attorney.

Patented Apr. 23, 1940

2,197,875

UNITED STATES PATENT OFFICE 2,197,875

CLAMPING MECHANISM

Eugene A. Odin, Chicago, Ill.

Original application May 3, 1937, Serial No. 140,460. Divided and this application December 28, 1938, Serial No. 248,096

6 Claims. (Cl. 81—41)

My invention is concerned with a specific clamping mechanism designed primarily for use in a universal vise designed to hold work securely at any desired angle in any desired position upon milling, drilling, grinding, and like machinery (such as is shown in my application No. 140,460 filed May 3, 1937, of which this application is a division) but which may be used elsewhere.

To illustrate my invention I annex hereto two sheets of drawings in which the same reference characters are used to designate identical parts in all the figures, of which—

Figure 1 is a central vertical section of the supporting mechanism of such a vise in one adjustment thereof, and in which my novel clamping is employed;

Fig. 2 is a perspective view of a tool used in assembling some of the parts;

Fig. 3 is a detail on a larger scale in section on line 3—3 of Fig. 1;

Fig. 4 is a locking bolt detached and seen in perspective;

Fig. 5 is a central vertical section of such a vise but with a different adjustment from that seen in Fig. 1 and with an intermediate portion omitted;

Fig. 6 is a perspective view, detached, of a tubular stud seen in place and in section in Figs. 1 and 5;

Fig. 7 is a similar perspective of a bolt co-operating therewith; and

Fig. 8 is a perspective view cut in half, of a locking collar interposed between the stud shown in Fig. 6 and the bolt shown in Fig. 7.

In carrying out my inventions in their preferred form, I employ three main frames or supporting parts, to-wit: the swivel base 31, which may or may not have the intermediate universal angle piece 32 mounted to swivel thereon on a vertical axis, and which in turn has the vise base 33 swiveled thereon on a horizontal axis thereon, as shown in Fig. 1, or I may swivel the vise base 33 directly on the base 31 on its vertical axis as shown in Fig. 5; and in either case the base 31 will be secured at any desired angle on the bed plate of the machine intended to work upon the article held in the vise.

In some cases I may secure the vise 33 directly on the bed plate of the machine, if the required adjustment does not necessitate the use of either of the members 31 and 32.

The swivel base 31 may have any desired shape, and is provided with any customary means (not shown) for securing it on the bed plate of any milling, drilling, grinding or other machine (not shown) with which it is to be used. It preferably has in it the circular under-cut channel 36 in which the heads of the bolts 37 (see Figs. 1 and 5) may be placed to secure the intermediate angle piece 32 in any desired adjustment upon the base 31, the bolts 37 extending upward through the U-shaped recesses 38, preferably bordered by the U-shaped raised portions 39 in the ends of the horizontal portion 32a of the angle piece 32, upon which raised portions the washers 40 rest held by the nuts 41 in the customary manner. The upper surface of the base 31 has the annular depression or recess 42 therein. If there is a tendency for the two members to contact only in the center and the parts yield, this serves to make the contact nearer to the outer edges which is desirable for the utmost accuracy.

The means to permit the accurate angular movement and adjustment of the intermediate angle piece 32 on the base 31 consists of the following mechanism: A tubular stud 43 (see Fig. 6) has the annular flange 44 through which the screws 45 pass into the adjacent underside of the horizontal portion 32a of the angle piece 32 to secure it thereto, the reduced upper end 46 extending into the stepped circular aperture 47 centrally located in said horizontal portion 32a. A bolt 48 (seen in Fig. 7), the circular head of which is preferably milled, extends up through the stud 43 through the washer 49, resting on the step in the aperture 47, and has threaded on its upper end the handle 50 extending through the rectangular aperture 51 in the vertical portion 32b of the angle piece 32. A collar or ring 52 (see Fig. 8) through which the bolt 43 passes, is held between its head and bottom of the stud 43, it being compelled to rotate with the latter by the pin 53 secured in the collar and extended up into the aperture 54 formed in the larger bottom portion of the stud 43. The bolt 48 has the (preferably two) radial recesses 55 therein containing the pins 56, the rounded outer ends of which may be forced into the annular channel 57, semi-circular in cross section, formed in the collar, by the beveled portion 58 of the adjustable locking member 59 (see Fig. 4) which has its lower end threaded into the axially extending bore formed in the bottom of the bolt 48. A hexagonal recess 61 in the bottom of the member 59 permits it to be turned by the tool 61a, (see Fig. 2) which is applied thereto after the parts have been assembled as shown in Fig. 1, to bring them into the position shown in Fig. 5, where the bolt 48 is held from turning in the hollow stud 43 by reason of the pressure of the outer ends of the pins 56 against the portions of the groove 57 which they engage when forced radially outward by the beveled portion 58 of the locking member 59 when it is screwed to the position shown. The pin 53 engaging the aperture 54 prevents the collar 52, now locked to the bolt 48, from turning relative to the angular piece 32 as the latter is adjusted relative to the base piece 31. While the parts are being initially assembled, the locking member 59 is not in place, so that the bolt 48 can be turned by its milled head relative to the member 32a to screw it far enough into the end of the lever 50 so that when the latter is turned through the 30 degree limit of its movement, the parts 31 and 32 will be rigidly clamped together. Once the handle 50 is in place and the angular piece 32 is properly adjusted on the base 31, turning the handle 50 through an angle of 30 degrees will lock them together or release them, depending upon which way it is swung. While thus adjusted at any desired angle it may, if desired, be finally secured thereon by the bolts 37 and nuts 41, as shown in Fig. 5.

It will be understood that due to this small possible swing, 30 degrees, of the lever 50, the position of the bolt 48 will have to be slightly adjusted now and then to take up the slight wear between the moving parts that would be negligible if the lever 50 could swing through any necessary number of degrees. By unscrewing the locking member 59 the bolt 48 can be turned up into the handle 50 as much as may be necessary to take up the wear, and then when the next adjustment is made, the member 59 is screwed back in place to lock the bolt 48 to the member 32, so that the latter can be released for adjustment merely by turning the lever 50 through its limited throw.

The foregoing description covers so much of my improved supporting mechanism for universal vises disclosed and claimed in my aforesaid application No. 140,460, as is necessary to understand the structure and mode of operation of my novel clamping mechanism included therein.

What I claim as new and desire to secure by Letters Patent of the United States is:

1. Clamping mechanism between two members, one of which is adjustable on the other which is relatively stationary, consisting of a bearing stud sleeve rigidly connected to the adjustable member and mounted to turn freely in the stationary member, a bolt having its head adapted to cooperate with the stationary member and its shank passing through the stud sleeve, a nut on the bolt adapted to engage the adjustable member to clamp the two together, and means to lock the bolt to the bearing stud or leave it free to turn therein.

2. Clamping means for two members, one of which is stationary and the other is angularly adjustable with respect thereto consisting of a bolt forming an axis about which the adjustable member can rotate and extending through both members with its head loosely engaging one member and a nut engaging the other member, and means interposed between such bolt and the member engaged by its nut adjustable without removing it either to lock the bolt when desired to said last mentioned member or to leave it free to turn therein.

3. Clamping means as described in claim 2 in which the interposed means consists of a collar on the bolt positively connected to the adjustable member so as to be movable to and from it but compelled to turn with it as it is turned during its adjustment, and a movable member carried by the bolt which can be moved to secure the collar to the bolt or release it therefrom.

4. Clamping means as described in claim 2 in which the interposed means consists of a collar on the bolt positively connected to the adjustable member so as to be movable to and from it but compelled to turn with it as it is turned during its adjustment, a movable member carried by the bolt which can be moved to secure the collar to the bolt or release it therefrom, and a member threaded into the head end of the bolt and having a conical surface engaging the movable member carried by the bolt to force it into engagement with the collar.

5. Clamping means as described in claim 2 in which the nut is on the end of a lever which has a limited movement through an opening in the angular adjustable member.

6. Clamping means as described in claim 2 in which the interposed means consists of a collar on the bolt having a pin thereon extending into a hole in the angularly adjustable member and a groove in its interior, a radially movable member mounted in the bolt adapted to enter said groove, and a screw member threaded into the center of the head of the bolt and having a conical surface adapted to engage the inner end of the radially movable member.

EUGENE A. ODIN.